UNITED STATES PATENT OFFICE.

THOMAS J. MAYALL, OF READING, MASSACHUSETTS.

RUBBER-COATED CLOTH.

SPECIFICATION forming part of Letters Patent No. 247,836, dated October 4, 1881.

Application filed May 7, 1881. (No specimens.)

*To all whom it may concern:*

Be it known that I, THOMAS J. MAYALL, of Reading, in the county of Middlesex, and Commonwealth of Massachusetts, have invented a new and useful Improvement in Rubber-Coated Cloths, of which the following is a specification.

My invention relates to the compound of materials which I use to give a rubber coating to cloth for the purpose of rendering it waterproof; and it consists in mixing and thoroughly incorporating in a mass, or in a solution, pure rubber and sulphide of antimony, commonly called "sulphuret of antimony," and applying it evenly to the surface of the cloth to be coated.

Cloth has been heretofore coated with a compound of rubber and sulphur, mixed with portions of various mineral substances; but, so far as I know, not with the compound I use.

To practice my invention I mix and thoroughly incorporate together, by grinding or in any other suitable way, pure rubber and sulphide or sulphuret of antimony in the proportion of one part of rubber to one or one and a half, or two, or two and one-half, or three, or, in some cases, more parts of the sulphide of antimony. This compound I dissolve in naphtha or other suitable solvent of rubber in sufficient quantity to make a thin fluid, which can be readily applied to the surface of cloth in the usual manner of applying rubber solution to cloth. For heavy cloths for blankets, overcoats, and similar articles, instead of dissolving the rubber and antimony compound, as before described, I run it out into thin sheets. This rubber and sulphide of antimony compound, either in solution or in thin sheets, as the nature of the product may require, I apply to cloth to be rendered impervious to water, and then cure the compound on the cloth by exposing it to the action of the direct rays of the sun for a length of time sufficient to produce the desired effect, generally about one to five hours, according to circumstances. The solution is applied by any suitable practicable method, preferably by the knife-spreading machine in general use in applying rubber compound to the gossamer rubber-cloths, as heretofore and now made, and I apply a number of coats of the compound sufficient to give the required body to the cloth before exposing it to the sun-rays. The thin sheet of rubber compound is applied to strong heavier cloths than those used to make what is known as "gossamer rubber-cloth," by giving the cloth a coat of the compound solution, and then laying the sheet of rubber on it and passing both together between rollers so close that the cloth and rubber sheet will be completely united. The rubber and sulphide of antimony compound is then cured in the manner already described, or in any other suitable way, and if the required quality of the cloth makes it necessary, artificial heat may be used to cure it.

By using the colored sulphides or sulphurets of antimony produced under a recent improvement in the method of reducing the ores of antimony to sulphide or sulphuret I give the rubber-coated cloths any color or shade of color or combination of colors desired from black to nearly white.

The rubber-coated cloths produced by the use of the compound described are very soft and pliable, light in proportion to thickness, and very durable, and much more economical than the rubber-coated cloths coated with the compounds in general use for that purpose.

I claim as new and my invention—

1. As a new article of manufacture, cloth coated with a compound of rubber and sulphide or sulphuret of antimony, applied and cured substantially as described.

2. The production of rubber-coated cloths of different and many colors by the use of the colored sulphides or sulphurets of antimony in combination with rubber, substantially as described.

THOS. J. MAYALL.

Witnesses:
CHS. HOUGHTON,
H. KENNEY, Jr.